March 21, 1939. W. J. MORRILL 2,151,561
DYNAMO-ELECTRIC MACHINE
Filed May 8, 1937
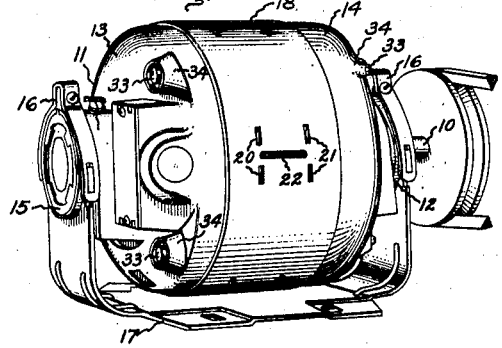
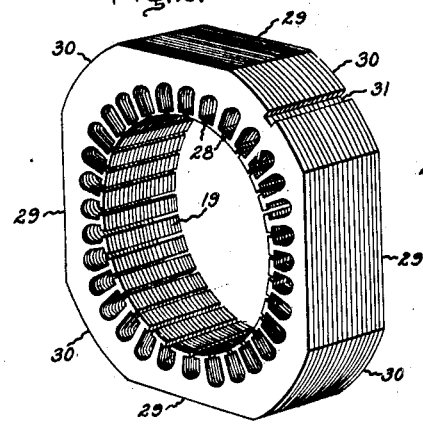
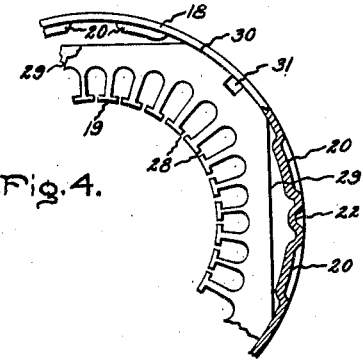
Inventor:
Wayne J. Morrill,
by Harry E. Dunham
His Attorney.

Patented Mar. 21, 1939

2,151,561

UNITED STATES PATENT OFFICE 2,151,561

DYNAMO-ELECTRIC MACHINE

Wayne J. Morrill, Fort Wayne, Ind., assignor to General Electric Company, a corporation of New York Application May 8, 1937, Serial No. 141,488

7 Claims. (Cl. 29—155.5)

My invention relates to improvements in dynamo-electric machines, and more particularly to a fabricated frame for dynamo-electric machines, and to a method of making the same.

An object of my invention is to provide an improved and simplified fabricated frame for dynamo-electric machines and a method of making the same.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a perspective view of a dynamo-electric machine embodying my invention; Fig. 2 is a perspective view of an assembly of laminations made according to my invention; Fig. 3 is a perspective view of a sheet metal shell of the machine shown in Fig. 1; Fig. 4 is a partial end view illustrating a step in the method of assembling the laminations in the frame shell structure; and Fig. 5 is a partial end view illustrating the final arrangement of the laminations in the frame shell.

Referring to the drawing, in Fig. 1 I have illustrated a dynamo-electric machine having a rotatable member mounted on a shaft 10 supported in bearings arranged in hubs 11 and 12 on the end shields 13 and 14 secured to the stationary member of the dynamo-electric machine. These hubs are supported by resilient bushings 15 secured by clamps 16 to a U-shaped supporting base 17. The stationary member of the dynamo-electric machine is provided with a fabricated frame shell 18 arranged to support a laminated core structure 19. This frame shell 18 is made by punching a rectangular flat sheet to form two parallel spaced apart sets of indentations or projections 20 and 21 adjacent the opposite edges of the sheet, and also punching an indentation or projection 22 extending across the sheet and intermediate the two parallel sets of projections 20 and 21. In punching the projections 20 and 21, care is taken that the inner adjacent sides 23 and 24 of the two sets of projections are formed substantially flat and at right angles to the surface of the metal sheet. Each set of projections also is formed in closely spaced pairs, which are spaced from another pair of projections in the same set a greater distance than the spacing between the projections of each pair. The projections in each set also are punched in alignment across the width of the sheet and arranged so that the spacing between projections in each pair and the spacing between pairs of projections in each set are substantially the same, and the projection 22 is formed intermediate the projections of parallel pairs of projections 20 and 21. The sheet of metal is then formed, as by rolling, into a cylindrical form with the parallel projections 20 and 21 extending radially inwardly and circumferentially of the shell, and the abutting ends 25 and 26 of the frame shell 18 are secured together by welding, as shown at 27. This provides a cylindrical frame having a series of radially extending projections 20 arranged in one transverse plane, and another series of radial projections 21 arranged in another transverse plane spaced axially or longitudinally of the frame shell from the plane of the projections 20.

The stationary member of the dynamo-electric machine is provided with a laminated core which is formed of a plurality of laminations 19 provided with winding slots 28. In making these laminations, they are punched with four straight sides 29 and four arcuate sides 30 arranged intermediate the straight sides 29. The arcuate sides 30 are formed on the arc of a circle equal in diameter to the inner diameter of the cylindrical frame shell 18, and the lengths of the straight sides 29 and the arcuate sides 30 are made such that the distance from the straight sides 29 to the arc of a circle corresponding to the arcuate sides 30 is sufficiently spaced from the ends of the straight sides 29 to permit the insertion of the laminations within the cylindrical casing, as shown in Fig. 4. When the assembly of laminations is inserted in the shell, the arcuate sides 30 engage the inner side of the cylindrical frame 18 between the pairs of projections 20 and 21, without having the straight sides 29 in engagement with the projections 20 and 21. The laminations 19 are also each punched with a slot 31 in an outer arcuate edge thereof, and the punching of the winding slots 28, the slot 31, and the straight and arcuate sides of the laminations is preferably all performed in one punching operation. A group of laminations is then assembled with the slot 31 in the arcuate edge in each lamination in registry, so as to provide a laminated core having a recessor groove in the outer periphery of one of the arcuate edges thereof. This core tightly fits the inside of the frame shell 18. These laminations are then clamped together and inserted in the frame shell 18 with the straight sides 29 extending over the radial projections 20 and 21 with the arcuate sides in contact with the span of the cylindrical frame between longitudinally spaced pairs of projections as shown in Fig. 4. The assembled laminations are pressed in a longitudinal position within the frame shell 18 intermediate the two parallel sets of projections, and then the frame shell and laminations are rotated with respect to each other to a position wherein the arcuate sides 30 of the laminations are in the same circumferential position as the radial projections 20 and 21, and so that the longitudinal projection 22 extends within and engages the slot 31 in the laminations. In order to facilitate the rotation of the laminations and frame shell 18 into the desired position, the laminations are preferably arranged so that the arcuate edge in which the slot 31 is formed is inserted in the frame shell in one of the arcuate spans between pairs of projections adjacent the projection 22, as shown in Fig. 4. In rotating the frame shell and laminations with respect to each other, the frame shell 18 will be slightly deformed, as the projection 22 passes over the arcuate sides 20 of the laminations, but it will again assume its cylindrical form when the projection 22 snaps into position within the slot 31. This will insure against circumferential displacement of the laminations within the frame shell, and the engagement of the inner flat sides 23 and 24 of the projections 20 and 21, respectively, with the outer laminations of the group of laminations 19 will securely clamp the core within the frame shell when the laminations are released. This final assembled form of the laminations 19 within the frame shell 18 is shown in Fig. 5. As can be seen from this figure, the straight sides of the laminations provide open spaces 32 between the frame and the laminations for the circulation of air. The core may be provided with suitable windings before or after securing the core in the frame shell. In assembling the dynamo-electric machine, the end shields 13 and 14 are secured to the frame by through bolts 33, extending through the openings 32 and bosses 34 formed on the end shields. In this manner, the end shields 13 and 14 and frame 18 are securely clamped together without the necessity of providing a special clamping arrangement on the frame of the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A dynamo-electric machine including a frame comprising a substantially cylindrical shell, a plurality of spaced apart circumferentially extending projections having substantially flat radially extending inner sides formed on said shell, an inwardly extending projection intermediate said circumferential projections formed longitudinally of said shell, an assembly of laminations secured in assembled relation within said shell by engagement of said inner sides of said circumferential projections about the outer laminations of said assembly, a longitudinally extending groove formed in said assembly of laminations arranged in engagement with said longitudinal projection, the outer circumference of said laminations being provided with straight sides intermediate the portions thereof secured between said projections to provide open spaces between said shell and said laminations, an end shield arranged on an end of said shell, and means for securing together said end shield and said shell extending through said open spaces between said shell and said laminations.

2. The method of making a dynamo-electric machine frame having spaced apart projections thereon for securing an assembly of laminations therein, which comprises forming a recess in an assembly of laminations, inserting an assembly of laminations within the shell out of engagement with the projections and with the recess in the laminations out of engagement with the projections, turning the assembly of laminations with respect to the projections to secure the laminations between the projections and to bring the recess into engagement with one of the projections to retain the assembly of laminations in place.

3. The method of making a dynamo-electric machine frame having a cylindrical shell provided with spaced apart projections on the inner surface thereof and a projection on the inner surface extending axially of the frame intermediate the projections, making an assembly of laminations having arcuate faces conforming to the inner surface of the shell and a groove across one of said arcuate faces, inserting the assembly of laminations in said shell out of engagement with said projections, turning the assembly of laminations with respect to the shell to bring the arcuate faces between the projections and bring the axially extending projection into engagement with said groove to retain the laminations in place.

4. The method of making a dynamo-electric machine frame which comprises forming two parallel spaced apart sets of projections in a sheet of metal with inner sides substantially flat and extending at substantially right angles to the surface of the metal sheet, forming the sheet of metal into a substantially cylindrical shell, assembling and clamping together an assembly of non-circular laminations with a plurality of arcuate sides to provide a laminated core, arranging the assembly of laminations in the cylindrical shell between the inner sides of the two parallel sets of projections longitudinally thereof intermediate the two sets of parallel projections with the arcuate sides of the laminations circumferentially between the two sets of projections, rotating the assembly of laminations and the shell with respect to each other to a position with the arcuate sides of the laminations in the same circumferential position as the circumferentially extending projections, and removing the clamping means from the assembly of laminations.

5. The method of making a dynamo-electric machine frame which comprises forming two parallel spaced sets of spaced apart projections in a sheet of metal, forming a projection extending across the metal sheet intermediate the two parallel sets of projections, forming the sheet of metal into a substantially cylindrical shell, forming a slot in an edge of each of a group of non-circular laminations with a plurality of arcuate sides, making an assembly of laminations with the slot in the edge of each lamination in registry to provide a groove in the periphery thereof, and arranging the assembly of laminations in the cylindrical shell longitudinally thereof intermediate the two parallel sets of projections with the arcuate sides of the laminations circumferentially between the two parallel sets of projections, rotating the assembly of laminations and the shell with respect to each other to a position with the groove in the assembly of laminations in engagement with the projection intermediate the parallel projections on the shell and the arcuate sides of the laminations in the same circumferential position as the circumferentially extending projections.

6. The method of making a dynamo-electric machine frame which comprises punching two parallel spaced apart sets of projections in a sheet of metal, forming the sheet of metal into a substantially cylindrical shell with the parallel projections extending radially in circumferentially spaced relation, forming an assembly of laminations with a plurality of straight sides and intermediate arcuate sides corresponding to the arcuate spans between adjacent circumferentially spaced radial projections on the shell, inserting in the shell the assembly of laminations with the straight sides thereof extending over the radial projections into a position longitudinally of the shell intermediate the two parallel sets of projections and rotating the assembly of laminations and the shell with respect to each other to a position in which the arcuate sides of the laminations are in the same circumferential position as the circumferentially extending projections.

7. The method of making a dynamo-electric machine frame which comprises forming two parallel spaced apart sets of projections in a sheet of metal, forming a projection extending across the metal sheet intermediate the two parallel sets of projections, forming the sheet of metal into a substantially cylindrical shell with the parallel projections extending radially inwardly in circumferentially spaced relation, forming an assembly of laminations with a plurality of straight sides and intermediate arcuate sides corresponding to the arcuate spans between adjacent circumferentially spaced radial projections on the shell, forming a slot in the outer edge of an arcuate side of each group of laminations, clamping together an assembly of the laminations with the slot in the edge of each lamination in registry to provide a groove in the periphery thereof, inserting in the shell the assembly of laminations with the straight sides thereof extending over the radial projections into a position longitudinaly of the shell intermediate the two parallel sets of projections, rotating the laminations and the shell with respect to each other to a position wherein the projection intermediate the parallel projections in the shell engages the groove in the assembly of the laminations, and releasing the laminations.

WAYNE J. MORRILL.